(12) United States Patent
Choi et al.

(10) Patent No.: US 12,500,259 B2
(45) Date of Patent: Dec. 16, 2025

(54) APPARATUS FOR MANUFACTURING BATTERY CELL

(71) Applicant: SK On Co., Ltd., Seoul (KR)

(72) Inventors: Gil Yong Choi, Daejeon (KR); Joo Hyung Kim, Daejeon (KR); Hyung Joon Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 17/691,613

(22) Filed: Mar. 10, 2022

(65) Prior Publication Data

US 2022/0293999 A1 Sep. 15, 2022

(30) Foreign Application Priority Data

Mar. 10, 2021 (KR) .......................... 10-2021-0031422
Feb. 25, 2022 (KR) .......................... 10-2022-0025118

(51) Int. Cl.
*H01M 10/04* (2006.01)

(52) U.S. Cl.
CPC .............................. *H01M 10/0404* (2013.01)

(58) Field of Classification Search
CPC ............................................. H01M 10/0404
See application file for complete search history.

(56) References Cited

FOREIGN PATENT DOCUMENTS

| CN | 105428696 A | | 3/2016 | |
|----|----|----|----|----|
| CN | 108400368 A | * | 8/2018 | ........ H01M 10/0404 |
| JP | 2019-200973 A | | 11/2019 | |
| KR | 10-2015-0049969 A | | 5/2015 | |
| KR | 20150049969 A | * | 5/2015 | |
| KR | 10-1974443 B1 | | 5/2019 | |
| KR | 102104319 B1 | * | 4/2020 | |
| KR | 102163499 B1 | * | 10/2020 | |
| KR | 20210101126 A | * | 8/2021 | |

OTHER PUBLICATIONS

Extended European Search Report for the European Patent Application No. 22160935.7 issued by the European Patent Office on Aug. 1, 2022.

* cited by examiner

*Primary Examiner* — Matthew T Martin
*Assistant Examiner* — Krishna R Hammond
(74) *Attorney, Agent, or Firm* — IP & T GROUP LLP

(57) ABSTRACT

An apparatus for manufacturing a battery cell for processing a sealing part of a battery cell, the sealing part being formed on one side of a body part in which an electrode assembly is accommodated, includes: a support unit including a first support portion and a second support portion supporting the battery cell in different directions; and a pressing unit moving toward the support unit to bend the sealing part, wherein the first support portion reciprocates in a first direction, the second support portion reciprocates in a second direction, and the second direction is inclined with respect to the first direction.

13 Claims, 6 Drawing Sheets

APPARATUS FOR MANUFACTURING BATTERY CELL

CROSS-REFERENCE TO RELATED APPLICATION(S)

This application claims benefit of priority to Korean Patent Application No. 10-2021-0031422 filed on Mar. 10, 2021 and No. 10-2022-0025118 filed on Feb. 25, 2022 in the Korean Intellectual Property Office, the disclosures of which are incorporated herein by reference in their entirety.

BACKGROUND

1. Field

The present disclosure relates to an apparatus for manufacturing a battery cell.

2. Description of Related Art

Recently, secondary batteries that are rechargeable have been widely used as energy sources of wireless mobile devices. In addition, secondary batteries have been prominent as power sources of electric vehicles (EVs), hybrid electric vehicle (HEVs) and the like that have been suggested as solutions for solving air pollution produced by existing gasoline vehicles, diesel vehicles and the like.

Typically, during the manufacturing process of a battery cell, the battery cell undergoes an operation of folding a sealing part of an exterior material (or a sealing part) of the battery cell. The folding refers to folding the sealing part of the exterior material of the battery cell toward a body part of the battery cell. Since an area of the sealing part of the battery cell is very narrow compared to the overall size of the battery cell, it is generally difficult to fold the sealing part in a desired position, and the battery cell may be damaged in the process of folding the sealing part, such that a defect of the battery cell may occur.

SUMMARY

An aspect of the present disclosure may provide an apparatus for manufacturing a battery cell capable of increasing efficiency and reliability of a process of manufacturing the battery cell. Specifically, an aspect of the present disclosure may provide an apparatus for manufacturing a battery cell capable of stably maintaining a folding angle after a folding process of folding an exterior material of the battery cell is performed and stably performing a pressing process even when a gap between a body part and a sealing part of the battery cell is small.

According to an aspect of the present disclosure, an apparatus for manufacturing a battery cell for processing a sealing part of a battery cell, the sealing part being formed on one side of a body part in which an electrode assembly is accommodated, may include: a support unit including a first support portion and a second support portion supporting the battery cell in different directions; and a pressing unit moving toward the support unit to bend the sealing part, wherein the first support portion reciprocates in a first direction, the second support portion reciprocates in a second direction, and the second direction is inclined with respect to the first direction.

The second support portion may be rotatable around a rotation axis perpendicular to both the first direction and the second direction.

The apparatus may further include a guide unit connected to the second support portion to guide rotation of the second support portion, wherein the pressing unit is connected to the guide unit.

As the guide unit rotates, the pressing unit and the second support portion may rotate together around the rotation axis.

The rotation axis may be formed between the first support portion and the second support portion.

The guide unit may include a guide groove having a curvature corresponding to a rotation path of the guide unit.

The guide unit may include: a first cylinder moving the pressing unit in a third direction different from the second direction; and a second cylinder moving the second support portion in the second direction.

The third direction may intersect the second direction.

The pressing unit may include a pressing surface pressing and bending the sealing part of the battery cell, and at least a portion of the pressing surface may be a flat surface parallel to the second direction.

The pressing surface may be in contact with the sealing part to heat the sealing part.

One surface of the sealing part may be in contact with and pressed by the pressing unit, and the other surface of the sealing part opposite to the one surface of the sealing part may be in contact with and supported by the second support portion.

The sealing part is configured to be folded toward the body part, and the second support portion is configured to be inserted between the body part and the sealing part.

The pressing unit may reciprocate in a third direction intersecting the second direction.

The second support portion may be configured as a plate-shaped member having a surface parallel to the second direction.

According to another aspect of the present invention, an apparatus for manufacturing a battery cell including a body part in which an electrode assembly is accommodated and a folded sealing part formed on a side of the body part, may include: a guide unit, a pressing unit coupled to the guide unit, and a support unit including a first support portion and a second support portion, in which the second support portion is coupled to the guide unit, the guide unit is rotatable and the press unit and the second support portion are configured to rotate together with the guide unit, the first and second support portions are configured to hold and support the battery cell with the second support portion positioned between the side of the battery cell and the folded sealing part, and wherein the pressing unit is configured to press and heat the folded sealing part against the second support portion.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
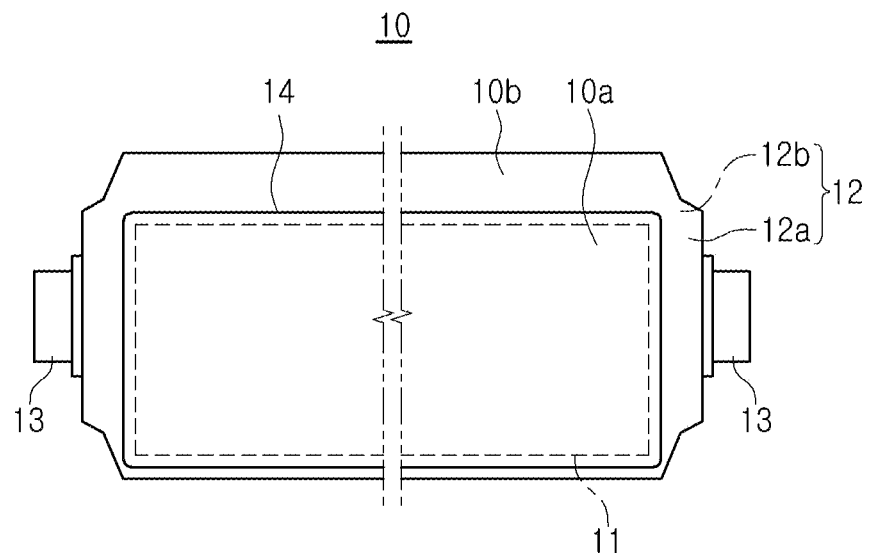
FIG. 1 is a view illustrating a pouch-type battery cell.

Terms and words used in the present specification and the claims to be described below are not to be construed as general or dictionary meanings, and are to be construed meanings and concepts conforming to the technical spirit of the present disclosure based on a principle that the inventors may appropriately define concepts of terms in order to describe their own inventions in the best mode. Accordingly, configurations described and illustrated in embodiments and drawings of the present disclosure are merely embodiments, and do not represent the entirety of the technical spirit of the present disclosure. Thus, it is to be understood that there may be equivalents and substitutions capable of substituting for these configurations at a point in time when the present application is filed.

Hereinafter, embodiments of the present disclosure will be described with reference to the accompanying drawings. However, embodiments of the present disclosure may be modified into many different forms and the scope of the present disclosure is not limited to the embodiments set forth herein. In addition, the embodiments of the present disclosure are provided in order to further completely describe the present disclosure to those skilled in the art. In the drawings, shapes, sizes and the like of components may be exaggerated for clarity.

In addition, singular forms used herein include plural forms unless the context clearly dictates otherwise, and throughout the specification, the same components or corresponding components will be denoted by the same reference numerals.

In addition, terms "upper side", "upper portion", "lower side", "lower portion", "side surface", "front surface", and "rear surface" used herein are represented based on directions illustrated in the drawings, and may be differently represented when directions of corresponding targets are changed.

In addition, terms including ordinal numbers such as "first" and "second" used herein may be used to describe various components, but these components are not limited by these terms, and these terms are used only to distinguish one component from another component. For example, a 'first' component may be named a 'second' component and the 'second' component may also be similarly named the 'first' component, without departing from the scope of the disclosure.

Figure 2:
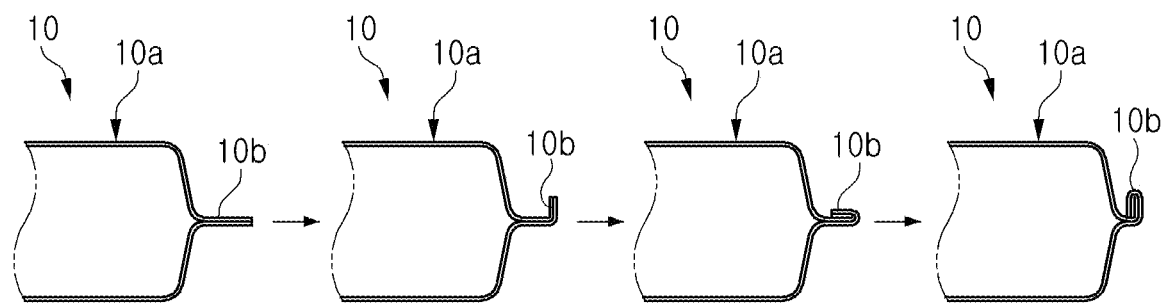
FIG. 2 is views illustrating a process in which a sealing part of the battery cell is folded according to a folding process.

FIG. 1 is a view illustrating a pouch-type battery cell 10. FIG. 2 is views illustrating a process in which a sealing part of the battery cell 10 is folded according to a folding process. Hereinafter, a folding process of the battery cell 10 will be described with reference to FIGS. 1 to 2.

First, referring to FIG. 1, the battery cell 10 includes an electrode assembly 11 and an exterior material (or a pouch) surrounding the electrode assembly 11. The electrode assembly 11 may be provided in a form in which a positive electrode plate and a negative electrode plate are sequentially stacked, and may further include a separator between the positive electrode plate and the negative electrode plate.

The exterior material 12 may be provided to surround the electrode assembly 11 to constitute an appearance of the battery cell 10, and may protect the electrode assembly 11 from external impact. In addition, the exterior material 12 may seal the electrode assembly 11 from the outside. The battery cell 10 includes electrode tabs 13 extending in a length direction, and the electrode tabs 13 are connected to an electrode plate (the positive electrode plate or the negative electrode plate) of the electrode assembly 11.

The exterior material 12 may be provided to surround the electrode assembly 11 on both surfaces of the electrode assembly 11 like a sandwich. For example, the exterior material 12 may include a first exterior material 12a surrounding an upper portion of the electrode assembly 11 and a second exterior material 12b surrounding a lower portion of the electrode assembly 11. An inner portion of the exterior material 12 surrounds the electrode assembly 11, and a peripheral portion of the exterior material 12 may be bonded to a peripheral portion of an exterior material 12 on an opposite side. For example, the first exterior material 12a and the second exterior material 12b are bonded to each other at edge portions (also referred to as peripheral portions or sealing portions) thereof. In the described embodiment of FIG. 1, the first exterior material 12a and the second exterior material 12b may be provided as a single exterior material 12. That is, a single exterior material 12 may surround the electrode assembly 11 over the upper portion and the lower portion of the electrode assembly 11, and may be bonded near the other sides (e.g., an upper long side and both short sides of the battery cell 10 of FIG. 1) of the electrode assembly 11 except for one side (e.g., a lower long side of the battery cell 10 in FIG. 1) of the electrode assembly 11 to seal the electrode assembly 11 from the outside.

In some embodiments, the battery cell 10 may include a body part 10a and a sealing part 10b. The body part 10a is a part in which the electrode assembly 11 is accommodated, and refers to a part having a thickness corresponding to the electrode assembly 11. A cross section of the body part 10a may include the electrode assembly 11 and the exterior material 12 covering both sides of the electrode assembly 11. The sealing part 10b refers to a thin part extending from at least one edge of the body part 10a in the length direction (or a direction perpendicular to a stacking direction). For example, a cross section of the sealing part 10b may include twofold exterior materials (e.g., the first exterior material 12a and the second exterior material 12b) bonded to each other.

Referring to FIG. 2, the sealing part 10b of the battery cell 10 may be gradually folded while undergoing a plurality of folding processes. In this case, the respective folding processes may be performed by one folding process part or be sequentially performed by individual folding process parts.

As illustrated in FIG. 2, the sealing part 10b of the battery cell 10 may be folded one or more times while undergoing the plurality of folding processes. For example, the sealing part 10b of the battery cell 10 may be folded by about 90° in a first folding process and may be folded again by 90° in a second folding process to a state in which it is folded by 180°. The folded sealing part 10b of the battery cell 10 may then be additionally folded by 90° in a third folding process. Finally, the sealing part 10b may be positioned adjacent to a sidewall 14 (see FIG. 1) of the body part 10a.

In the embodiment illustrated in FIG. 1, the exterior material 12 is sealed on three side surfaces of the battery cell 10 and the sealing part 10b illustrated in FIG. 2 refers to a portion in which the electrode tabs 13 are not positioned among extra portions of the exterior material 12 of the battery cell 10 of FIG. 1 remaining after surrounding the electrode assembly 11. That is, the sealing part 10b of FIG. 2 refers to an upper side portion of the battery cell 10 among the extra portions of the exterior material 12 of the battery cell 10 of FIG. 1 remaining after surrounding the electrode assembly 11.

However, it is noted that the battery configuration sealing parts may be formed on all four sides of the battery cell. In such an embodiment, when sealing parts are formed on four surfaces of the battery cell 10 by overlapping two exterior materials 12, a process of folding an upper side portion and a lower side portion of the battery cell 10 where the electrode tabs 130 are not positioned may be performed several times,.

A sealing part 10b to be described later with reference FIGS. 3 to 7 corresponds to the sealing part 10b of FIG. 2, and an overlapping description thereof is thus omitted.

Figure 4:
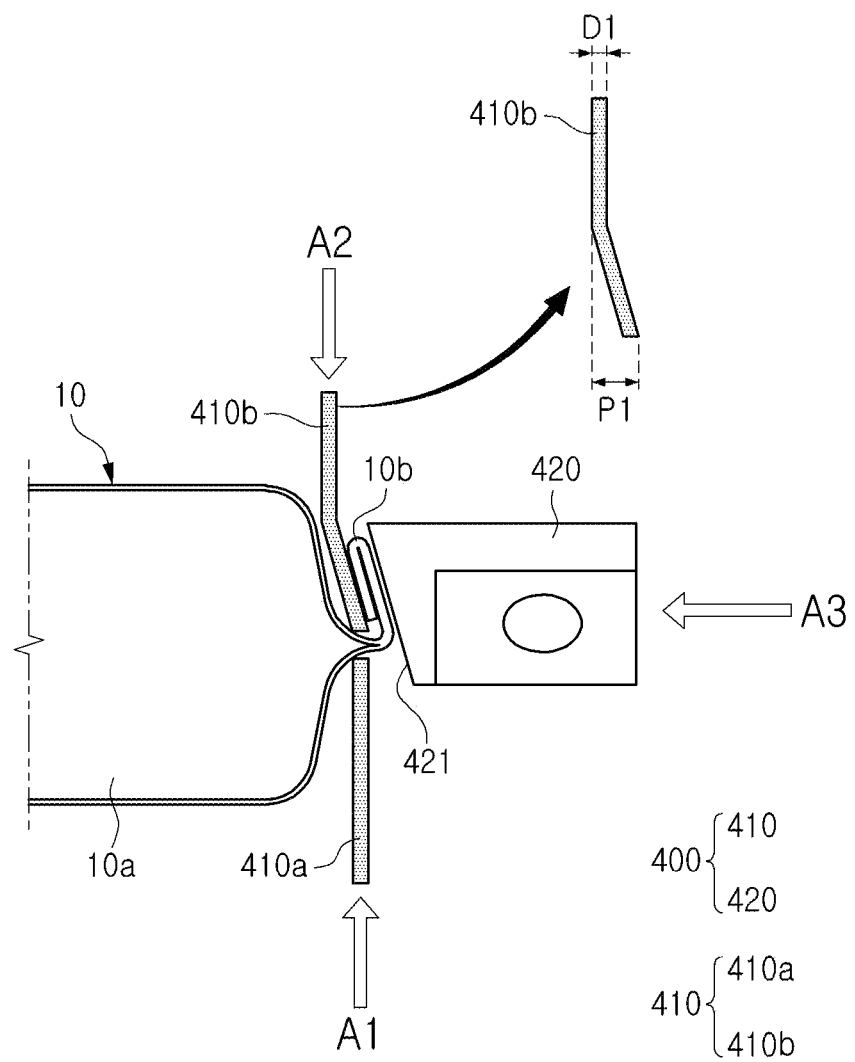
FIG. 4 is an illustrative view of a press module according to the related art.

In addition, it is noted that FIG. 4 illustrates a folding process which includes four folding operations. However, this is only an example, and the folding process may include two, three, or five or more folding operations.

Figure 3:
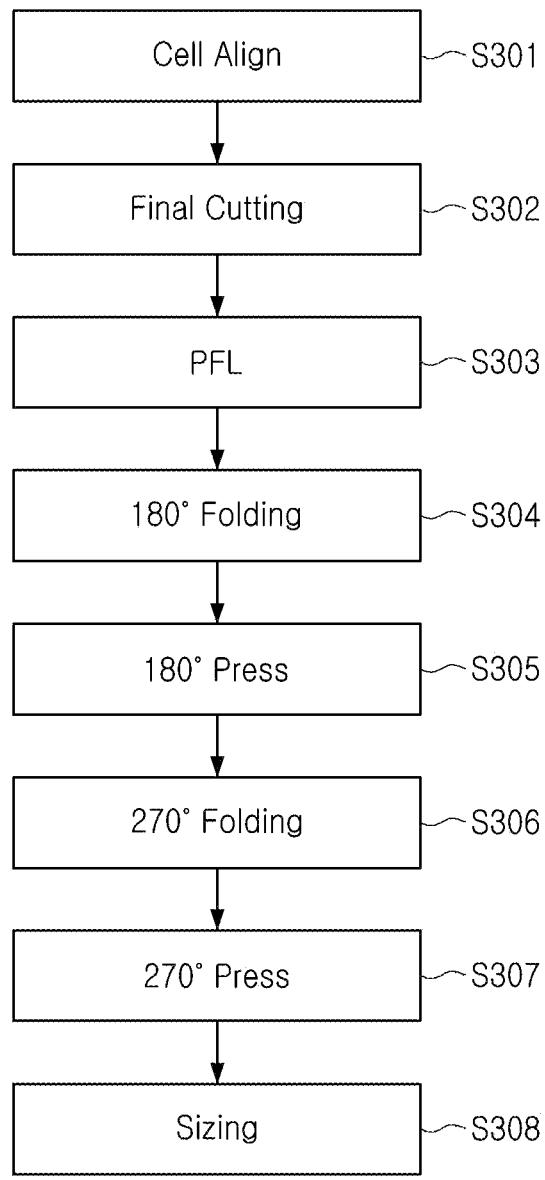
FIG. 3 is a flowchart of a folding process according to embodiments of the present invention.

A folding process will be described now in more detail with reference to the flowchart of FIG. 3. A battery cell and its components described with reference to FIG. 3 correspond to the battery cell and its components described with reference to FIGS. 1 and 2, and an overlapping description thereof is thus omitted.

Before the sealing part 10b (see FIG. 1) of the battery cell 10 (see FIG. 1) is folded, a position of the battery cell is aligned in an aligning step S301. That is, in the aligning step S301, in order to accurately fold the sealing part 10b at a desired position, the battery cell 10 is positioned at a proper position.

After the battery cell is positioned at the proper position, a cutting step S302 of cutting the battery cell to a predetermined length is performed so that the sealing part 10b of the battery cell 10 may be folded by a specified length. The cutting step S302 may also be referred to herein as the final cutting step.

Before the folding process is performed, a pre-forming location (PFL) step S303 is performed. The pre-forming location (PFL) step S303 pre-forms a corresponding folding line to prevent meandering at the time of folding the sealing part 10b.

The sealing part 10b of the battery cell 10 that has undergone the PFL step S303 is folded at least once in a first folding step S304, such that a distal end of the sealing part 10b is directed toward the sidewall 14 of the body part 10a of the battery cell (see the third drawing of FIG. 2). That is, in the first folding step S304, the sealing part 10b is folded by 180°.

In a first press step S305, the sealing part 10b folded by 180° is pressed and formed with heat and pressure. The heat and the pressure are applied to a folded portion of the sealing part 10b to maintain a shape of the folded sealing part 10b.

The folded sealing part 10b is again folded at least once in a second folding step S306, such that the sealing part 10b is directed toward a width direction of the battery cell 10. That is, in the second folding step S306, the sealing part is folded by 90° in the same direction as a direction in which the sealing part is folded in the first folding step (see the fourth drawing of FIG. 2). In an embodiment, the second folding step S306 may be also referred to as the 270° folding step S306.

Then, in a second press step S307, the folded sealing part 10b is further pressed while in the 270° folded configuration with heat and pressure and is further folded in a counter-clockwise direction. The heat and the pressure are applied to the folded portion of the sealing part 10b to maintain a shape of the folded sealing part 10b. In an embodiment, the second press step S307 is also referred to as the 270° press step S307.

In a sizing step S308, the folded sealing part 10b passes through a sizing roller to form the sealing part 10b so that the sealing part 10b is adjacent to the sidewall of the body part 10a of the battery cell 10. Accordingly, the folded sealing part 10b forms an acute angle with respect to the sidewall 14 of the body part 10a of the battery cell 10, and is adjacent to the sidewall 14 of the body part 10a of the battery cell 10.

However, in the folding process, at least some of the several processes described with reference to FIG. 3 may be omitted, or some processes may be further added. In addition, the order of the several processes described with reference to FIG. 3 is not limited to that illustrated in FIG. 3, and any two or more processes may be performed simultaneously or be performed in a reversed order.

A press module capable of performing the second press step S307 of the folding process will hereinafter be described in detail with reference to FIG. 3.

FIG. 4 is an illustrative view of a press module 400 according to the related art.

The press module 400 is a folding angle forming unit. The press module 400 may press the folding surface at a high temperature and a high pressure sufficient to melt the exterior material formed of a polypropylene (PP) layer on an aluminum pouch.

As illustrated in FIG. 4, the press module 400 according to the related art may form the sealing part 10b of the battery cell 10 so that the folded sealing part 10b is adjacent to the body part 10a of the battery cell 10 by applying heat and pressure to the sealing part 10b of the battery cell 10 in one direction e.g., the direction of the arrow A3 in FIG. 4.

The press module 400 according to the related art may include one or more support units 410 including first and second support portions 410a and 410b supporting the battery cell 10 to fix a position of the sealing part 10b of the battery cell 10 and a pressing unit 420 pressing the sealing part 10b in one direction.

The pressing unit 420 may apply heat and pressure to the sealing part 10b while further folding the sealing part 10b in one direction (e.g., a counterclockwise direction) around a portion of the battery cell 10 supported by the support unit 410 by pressing the sealing part 10b in one direction. A pressing surface 421 of the pressing unit 420 may be inclined so as to correspond to a shape of the sidewall of the body part of the battery cell 10 so that the sealing part 10b is folded adjacent to the body part of the battery cell 10. In other words, the pressing surface 421 of the pressing unit 420 may be formed to be oblique with respect to a direction in which the pressing unit presses the sealing part 10b.

The support unit 410 may include the first support portion 410a and the second support portion 410b that support the battery cell in different directions. For example, as illustrated in FIG. 4, the first support portion 410a and the second support portion 410b of the support unit 410 may support the battery cell 10 in opposite directions. The first support portion 410a and the second support portion 410b may be thin plate-shaped members extending in a length direction of the battery cell 10.

The support portions 410a and 410b may move in a sliding manner in a predetermined direction, and for example, as illustrated in FIG. 4, the first support portion 410a and the second support portion 410b may slide in opposite directions (e.g., a direction of arrow A1 and a direction of arrow A2) with the sealing part 10*b* of the battery cell 10 interposed therebetween to support the battery cell 10.

In some embodiments, the support portions 410*a* and 410*b* may be plate-shaped members, and may press a boundary between the body part 10*a* and the sealing part 10*b* of the battery cell 10 to fix a position of the battery cell 10. That is, the body part 10*a* of the battery cell 10 may be positioned on one side of the support portions 410*a* and 410*b*, and the sealing part 10*b* of the battery cell 10 may be positioned on the other side of the support portions 410*a* and 410*b*. In a state in which the battery cell 10 is supported by the support portions 410*a* and 410*b*, the pressing unit 420 presses the sealing part 10*b* toward the body part.

In the press module according to the related art, any one (e.g., the second support portion 410*b*) of the support portions has a shape in which a middle portion thereof is bent at a predetermined angle. For example, as illustrated in FIG. 4, the second support portion 410*b* may be a plate-shaped member of which a portion is bent. Since a portion of the second support portion 410*b* is bent, an entire width P1 of the second support portion 410*b* may be greater than a thickness D1 of the plate-shaped member itself. For this reason, when a space between the body part 10*a* of the battery cell 10 and the folded sealing part 10*b* is narrow, there is a risk that an interference effect will occur between the body part 10*a* of the battery cell 10 and the second support portion 410*b*, due to a shape of the second support portion 410*b* of which a portion is bent. In addition, there is a risk that a folded portion will be widened because the sealing part 10*b* is pushed in an opposite direction (e.g., a clockwise direction) to a direction (e.g., a counterclockwise direction) in which it is folded due to collision between a distal end of the second support portion 410*b* and the folded sealing part 10*b* in a process in which the second support portion 410*b* slides and rises after the sealing part 10*b* is pressed by the pressing unit 420.

In particular, in a case of a battery cell that has been recently developed, a gap between a body part 10*a* and a folded sealing part 10*b* is about 2 mm or less, but in a case of the press module 400 according to the related art, there is a problem that shapes of the second support portion 410*b* and the pressing unit 420 need to be changed according to a type of battery cell as well as there is a limitation in keeping an angle and a thickness of the second support portion 410*b* having a bent shape small.

A press module 500 (see FIG. 5) having a configuration different from that of the press module 400 according to the related art in order to solve the problem of the press module 400 according to the related art described with reference to FIG. 4 will hereinafter be described. The press module 500 includes first and second support portions 510*a* and 510*b* both having a cross section in a straight shape.

Figure 5:
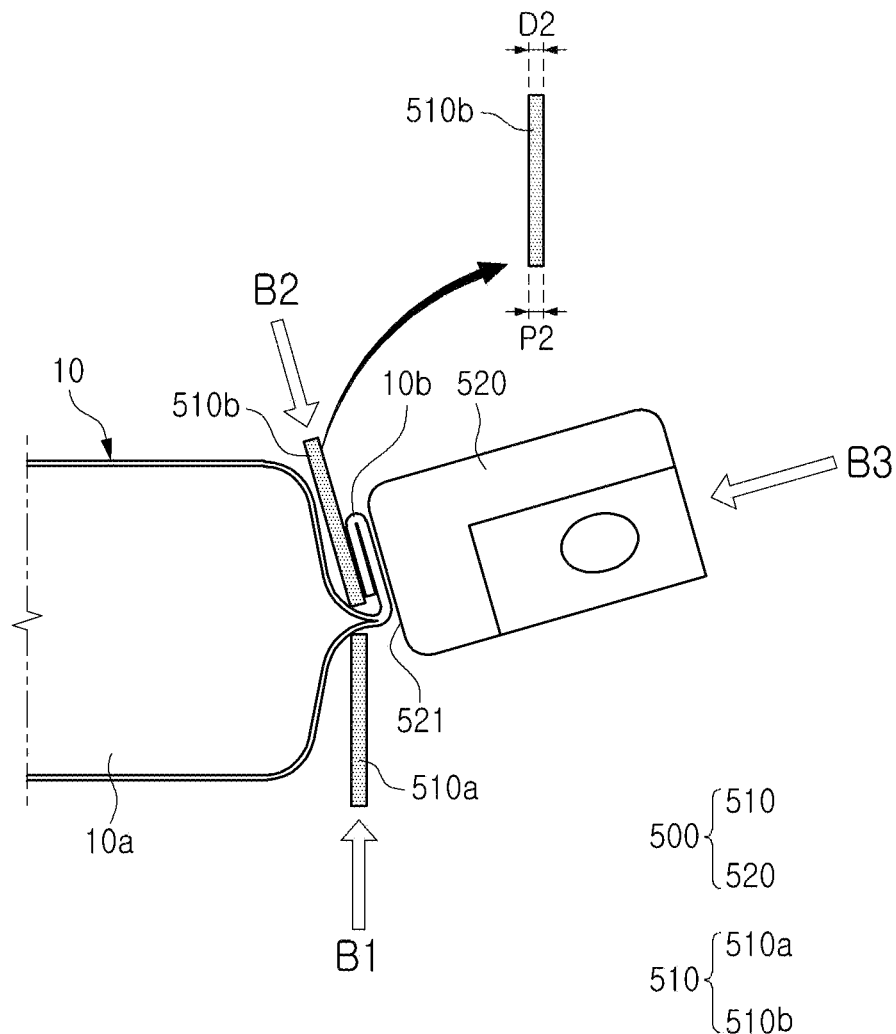
FIG. 5 is an illustrative view of a press module according to embodiments of the present invention.

FIG. 5 is an illustrative view of a press module 500 included in an apparatus for manufacturing a battery cell. Referring to FIG. 5, the press module 500 may include one or more support units 510 supporting the battery cell 10 to fix a position of the sealing part 10*b* of the battery cell 10 and a pressing unit 520 pressing the sealing part 10*b* in one direction to fold the sealing part 10*b* at a first angle. For example, as illustrated in FIG. 5, the press module 500 may include a support unit 510 including a first support portion 510*a* and the second support portion 510*b* driven in a sliding manner in different directions (e.g., a direction of arrow B1 direction and a direction of arrow B2) and a pressing unit 520 pressing the sealing part 10*b* in one direction (e.g., a direction of arrow B3). A moving direction of the pressing unit 520 may be different from moving directions of the first support portion 510*a* and the second support portion 510*b*. The moving direction of the pressing unit 520 may intersect a moving direction of the second support portion 510*b*.

A driving unit of the support unit 510 and the pressing unit 520 may be a generally widely used unit such as a cylinder, but is not necessarily limited thereto.

The pressing unit 520 may heat and press the sealing part 10*b* to bend the sealing part 10*b* toward the body part 10*a* of the battery cell 10.

In order for the pressing unit 520 to stably press the sealing part 10*b*, the support unit 510 may support the battery cell 10 to fix a position of the battery cell 10. For example, the first support portion 510*a* of the support unit approaches the battery cell 10 from below the battery cell 10, and the second support portion 510*b* of the support unit approaches the battery cell 10 from above the battery cell 10, such that the support unit 510 may hold the battery cell 10 from both sides and support the battery cell 10 not to move. The first support portion 510*a* and the second support portion 510*b* may support a boundary portion between the body part and the sealing part 10*b* in the battery cell 10. The pressing unit 520 may press and fold the sealing part 10*b* positioned between the first support portion 510*a* and the second support portion 510*b* in a direction toward the body part 10*a*.

In embodiments, at least a portion of the sealing part 10*b* of the battery cell 10 may be folded toward the body part 10*a*, and the second support portion 510*b* may be configured to be inserted between the body part 10*a* and the bent sealing part 10*b*.

Unlike the press module 400 of FIG. 4, the press module 500 according to embodiments of the present invention includes the support portions 510*a* and 510*b* each having a cross section with a straight line shape. That is, as illustrated in FIG. 5, the second support portion 510*b* may be provided to have a cross section with a straight line shape without a bent portion. Since there is no bent portion in the second support portion 510*b*, an entire width P2 of the second support portion 510*b* may be equal to a thickness D2 of a plate-shaped member itself. That is, the entire width P2 of the second support portion 510*b* according to embodiments of the present invention described with reference to FIG. 5 may be smaller than the entire width P1 of the second support portion 410*b* according to the related art described with reference to FIG. 4.

In addition, the second support portion 510*b* according to embodiments of the present invention is provided to be rotatable around a predetermined rotation axis. Here, the rotation axis may be an axis perpendicular to both the moving direction (direction of arrow B1) of the first support portion 510*a* and the moving direction (direction of arrow B2) of the second support portion 510*b*. That is, the second support portion 510*b* may support the battery cell 10 together with the first support portion 510*a* by being driven in a sliding manner in one direction in a state in which the second support portion 510*b* is rotated. Since the second support portion 510*b* rotates by a predetermined angle and is then driven in the sliding manner in one direction (e.g., the direction of arrow B2) in order to support the battery cell, the direction (e.g., the direction of arrow B2) in which the second support portion 510*b* is driven in the sliding manner may be inclined with respect to the direction (e.g., the direction of arrow B1) in which the first support portion 510*a* is driven in a sliding manner. For example, an angle between the moving direction (direction of arrow B2) of the second support portion 510*b* and the moving direction (direction of arrow B1) of the first support portion 510a may be the same as a rotation angle of the second support portion 510b.

Since the second support portion 510b is provided as a straight plate-shaped member having a straight line shape, the second support portion 510b may rise without touching the sealing part 10b in a process in which the second support portion 510b slides and rises again in an opposite direction (e.g., an opposite direction to arrow B2), that is, in a direction parallel to the folding surface, after the sealing part 10b is folded by the pressing unit 520. That is, unlike the press module 400 described with reference to FIG. 4, in the press module 500 according to embodiments of the present invention described with reference to FIG. 5, a risk that interference will occur between the sealing part 10b and the second support portion 510b in a process in which the second support portion 510b rises in order to release the support of the battery cell 10 may be prevented, and accordingly, a phenomenon in which the second support portion 510b touches the folded sealing part 10b to change a folding angle of the sealing part 10b may be prevented.

In addition, since the interference does not occur at the time of movement of the second support portion 510b and the entire thickness of the second support portion 510b may be decreased, the press module 500 is useful for manufacturing a battery cell in which a gap (e.g., 2 mm or less) between the body part 10a and the folded sealing part 10b of the battery cell 10 is small. That is, when only a gap equal to the thickness of the second support portion 510b is secured between the body part 10a and the folded sealing part 10b of the battery cell 10, a pressing process and a retreat process of the second support portion 510b may be stably performed.

Figure 6:
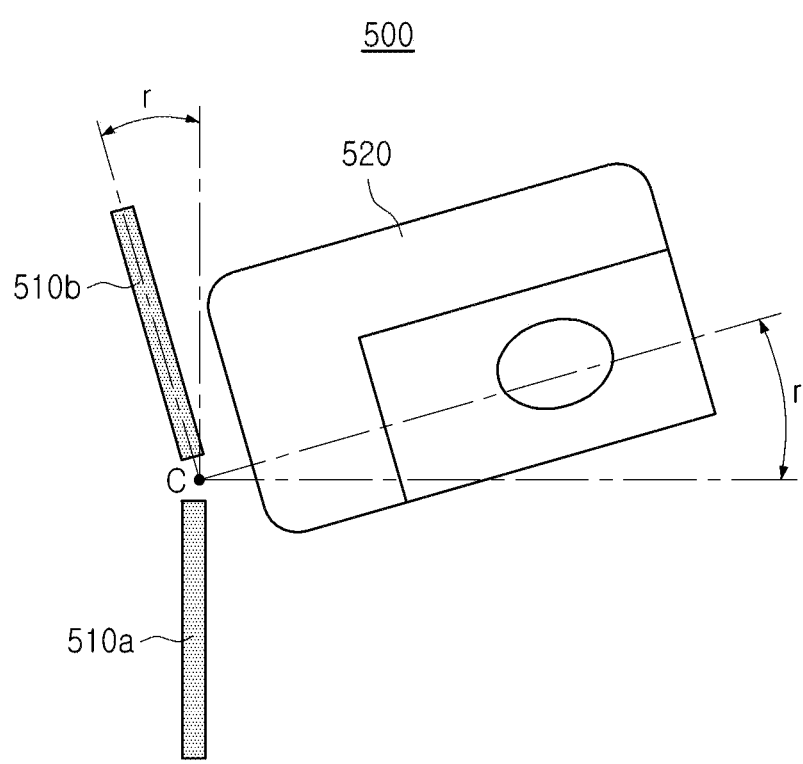
FIG. 6 is an illustrative view of a press module according to embodiments of the present invention.

In addition, as illustrated in FIG. 6, in the press module 500 (see FIG. 5) according to embodiments of the present invention, the second support portion 510b and the pressing unit 520 may be provided to be together rotatable with respect to the battery cell 10. That is, the second support portion 510b and the pressing unit 520 may rotate together by a predetermined rotation angle r around the same rotation axis C. The rotation axis C, which is a rotation center around which the second support portion 510b and the pressing unit 520 rotate together, may be formed between the first support portion 510a and the second support portion 510b. For example, the rotation axis C may be formed at a boundary between the body part and the sealing part 10b of the battery cell 10 supported by the support portions 510a and 510b.

Since the press module 500 according to embodiments of the present invention includes a second support portion 510b that has a cross section with a straight line shape and is also rotatable, a pressing surface 521 (See FIG. 5) of the pressing unit 520 applying heat and pressure to the sealing part 10b may have a flat shape corresponding to the shape of the second support portion 510b. In other words, a direction in which the pressing unit 520 according to embodiments of the present invention moves and presses the sealing part 10b (e.g., the direction of arrow B3 in FIG. 5) and the pressing surface 521 of the pressing unit 520 may be perpendicular to each other. In addition, at least a portion of the pressing surface 521 of the pressing unit 520 may be a flat surface parallel to the moving direction (e.g., the direction of arrow B2 in FIG. 5) of the second support portion 510b.

The press module 500 (see FIG. 5) according to embodiments of the present invention will hereinafter be described in more detail with reference to FIG. 7.

Figure 7:
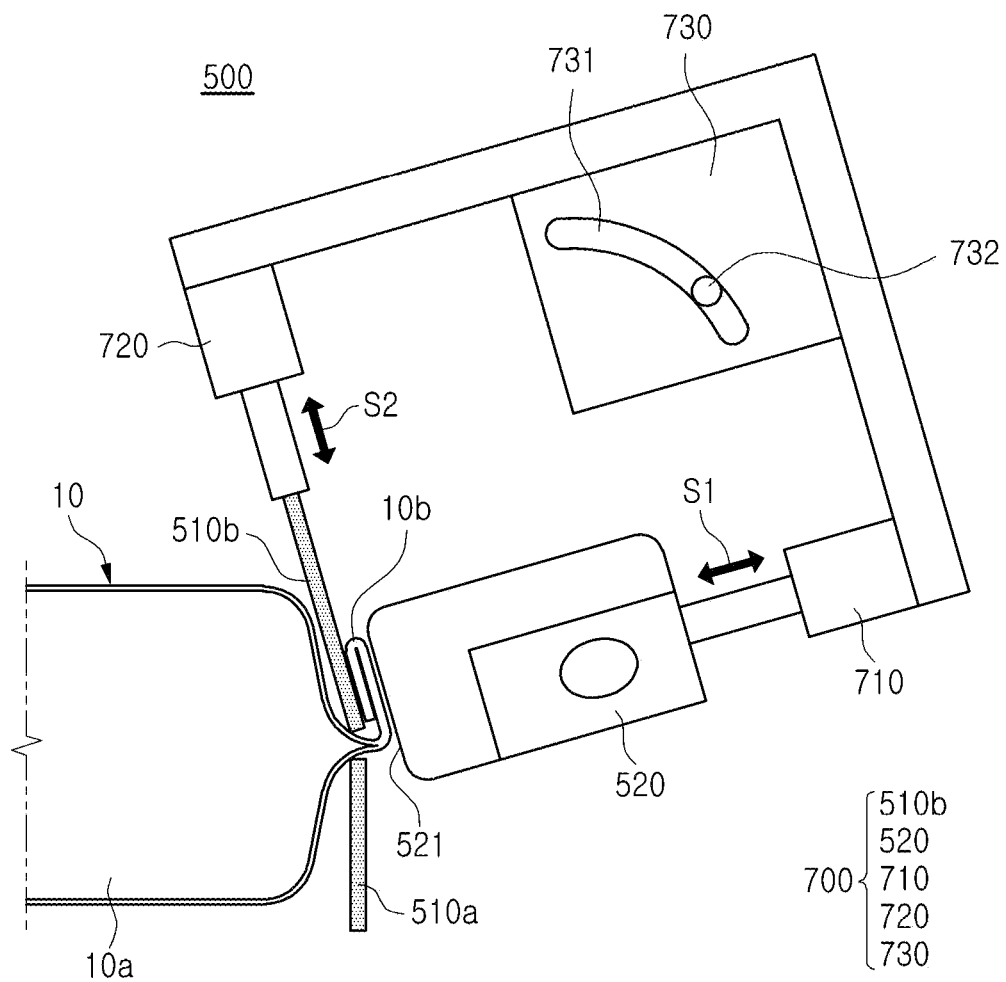
FIG. 7 is an illustrative view of a press module according to embodiments of the present invention.

FIG. 7 is an illustrative view of a press module 500 according to embodiments of the present invention. A press module 500, a first support portion 510a, a second support portion 510b, and a pressing unit 520 described with reference to FIG. 7 include all features of the press module 500, the first support portion 510a, the second support portion 510b, and the pressing unit 520 described with reference to FIGS. 5 and 6, and an overlapping description thereof is thus omitted.

In an embodiment, the press module 500 includes one or more support units 510 including a second support portion 510b, a pressing unit 520, and a guide unit 730 to which the second support portion 510b and the pressing unit 520 are connected.

The guide unit 730 may guide the rotation of the pressing unit 520 and the second support portion 510b.

The guide unit 730 may serve as a frame (i.e., a body) of a press assembly 700. For example, the guide unit 730 may entirely rotate or move by receiving a driving force from the outside, and accordingly, the pressing unit 520 and the second support portion 510b coupled to the guide unit 730 may also rotate or move together.

The guide unit 730 is rotatably provided, and includes a guide groove 731 guiding a rotation path of the guide unit 730. The guide groove 731 may be provided as a groove having a curvature corresponding to the rotation path of the guide unit 730. The center of the curvature of the guide groove 731 may constitute a rotation axis of the guide unit 730.

A guide protrusion 732 may be inserted into the guide groove 731. The guide protrusion 732 may be configured to be fixed to a structure (e.g., the ground or platform on which the press assembly is installed) outside the press assembly 700. In a state in which the guide protrusion 732 is fixed, the guide groove 731 may slide in a state in which it is in contact with the guide protrusion 732. Accordingly, the press assembly 700 may rotate along the rotation path corresponding to the curvature of the guide groove 731. The guide protrusion 732 may be provided in the form of a protrusion of which an end portion is inserted into the guide groove 731 or be provided in the form of a shaft penetrating the guide groove 731. However, a specific shape of the guide protrusion 732 is not limited to those described above.

A first cylinder 710 driven in a sliding manner is provided on one side of the guide unit 730, and the pressing unit 520 is connected to the first cylinder 710. A second cylinder 720 driven in a sliding manner is provided on the other side of the guide unit 730, and the second support portion 510b is connected to the second cylinder 720.

The guide unit 730, the first cylinder 710, the second cylinder 720, the second support portion 510b, and the pressing unit 520 may constitute one press assembly 700. That is, the press module 500 according to embodiments of the present invention may include the press assembly 700 and a first support portion 510a. The first support portion 510a may be separated and installed separately from the press assembly 700. For example, the first support portion 510a and the press assembly 700 may be supported to different portions of the press module 500. In embodiments of the present invention, the first support portion 510a may be driven in conjunction with the second support portion 510b and the press module 500. However, the installation and the driving of the first support portion 510a are not limited to those described above. For example, the first support portion 510a may be driven independently of the driving of the press assembly 700.

The press assembly 700 is rotatable within a range of a predetermined rotation angle (e.g., the rotation angle r in FIG. 6) through the guide unit 730. Accordingly, the second support portion 510*b* and the pressing unit 520 provided in the press assembly 700 are rotatable by the same rotation angle (e.g., the same rotation angle r in FIG. 6) around the same rotation center (e.g., the rotation center C in FIG. 6). The rotation angle of the press assembly 700 (e.g., the rotation angle r in FIG. 6) may be set differently, if necessary. That is, the rotation angle (e.g., the rotation angle r in FIG. 6) of the press assembly 700 may be changed according to a type of the battery cell 10 that needs to be supported or a specific shape of the sealing part 10*b*.

The first cylinder 710 and the second cylinder 720 included in the press assembly 700 may drive the pressing unit 520 and the second support portion 510*b* in a sliding manner in different directions, respectively. For example, as illustrated in FIG. 7, the pressing unit 520 may be connected to the first cylinder 710 to be driven in the sliding manner in one direction (direction of arrow S1) with respect to the guide unit 730. In addition, the second support portion 510*b* may be connected to the second cylinder 720 to be driven in the sliding manner in a different direction (direction of arrow S2) from the pressing unit 520 with respect to the guide unit 730, thereby supporting and fixing the battery cell 10 together with the first support portion 510*a*. In this case, a moving direction of the pressing unit 520 and a moving direction of the second support portion 510*b* may intersect each other, but are not limited thereto.

In embodiments of the present invention, the second support portion 510*b* and the pressing unit 520 are connected to the same guide unit 730, and thus, an angle formed by a driving direction of the second support portion 510*b* and a driving direction of the pressing unit 520 may always be constant. For example, as illustrated in FIG. 7, a driving direction S1 of the pressing unit 520 and a driving direction S2 of the second support portion 510*b* may be always maintained in a state in which they are perpendicular to each other. Accordingly, the driving direction S2 of the second support portion 510*b* and the pressing surface 521 of the pressing unit 520 may be parallel to each other. In addition, the second support portion 510*b* may have a plate shape parallel to the pressing surface of the pressing unit 520.

The press module 500 according to embodiments of the present invention may fold the sealing part 10*b* of the battery cell 10 by applying heat and pressure to the sealing part 10*b* of the battery cell 10. For example, the press assembly 700 is rotated so as to correspond to positions of the sealing part 10*b* and the body part 10*a* of the battery cell 10 set variously according to a model of the battery cell 10, and the first support portion 510*a* and the second support portion 510*b* are driven in the sliding manner to fix a position of the battery cell 10. In this case, the first support portion 510*a* and the second support portion 510*b* may support a boundary portion between the body part 10*a* and the sealing part 10*b* of the battery cell to fix the position of the battery cell 10. The pressing unit 520 applies heat and pressure to the sealing part 10*b* of the battery cell 10 of which the position is fixed by the support portions 510*a* and 510*b* to fold and form the sealing part 10*b*. One surface of the sealing part 10*b* may be in contact with and pressed by the pressing unit 520, and the other surface of the sealing part 10*b* opposite to one surface of the sealing part 10*b* may be in contact with and supported by the second support portion 510*b*. In this state, the pressing unit 520 may apply heat and pressure to the sealing part 10*b* to fold the sealing part 10*b* so that the sealing part 10*b* is as close to the body part 10*a* as possible. After the pressing unit 520 sufficiently applies the heat and the pressure to the sealing part 10*b*, the respective supporting parts 510*a* and 510*b* are driven again in opposite directions to the directions in which they are driven in the sliding manner to release the support of the battery cell 10. The formed battery cell 10 is transferred to a subsequent process.

According to the apparatus for manufacturing a battery cell according to embodiments of the present invention, the sealing part of the battery cell may be folded at a desired angle.

According to the apparatus for manufacturing a battery cell according to embodiments of the present invention, a folding angle of the battery cell may be stably maintained, and a pressing process may be stably performed even when a gap between the body part and the folded sealing part of the battery cell is small.

The apparatus for manufacturing a battery cell according to embodiments of the present invention may effectively fold some surfaces of the sealing part of the battery cell to prevent the sealing part from being unsealed. In addition, some surfaces of the sealing part of the battery cell are folded, such that a volume of an electrode assembly disposed in an internal space of a module housing having the same size may be increased.

While only some specific embodiments of the present invention have been shown and described above, it will be apparent to those skilled in the art that modifications and variations could be made without departing from the scope of the present invention as defined by the appended claims.

What is claimed is:

1. An apparatus for manufacturing a battery cell for processing a sealing part of a battery cell, the sealing part being formed on one side of a body part in which an electrode assembly is accommodated, comprising:
   a support unit including a first support portion and a second support portion supporting the battery cell in different directions;
   a pressing unit configured to move toward the support unit to heat and bend the sealing part; and
   a guide unit configured to guide rotation of the second support portion,
   wherein the first support portion is configured to reciprocate in a first direction, the second support portion is configured to reciprocate in a second direction, and the second direction is inclined with respect to the first direction,
   wherein the pressing unit and the second support unit are connected to the guide unit,
   wherein the pressing unit is configured to press and fold the sealing part, positioned between the first support portion and the second support portion, in a third direction that intersects the second direction at an angle,
   wherein the third direction is configured to extend towards the body part, such that the pressing unit is configured to press the sealing part against the body part, and
   wherein the second direction and third direction are arranged perpendicularly.

2. The apparatus of claim 1, wherein the second support portion is rotatable around a rotation axis perpendicular to both the first direction and the second direction.

3. The apparatus of claim 2, wherein as the guide unit rotates, the pressing unit and the second support portion rotate together around the rotation axis.

4. The apparatus of claim 3, wherein the rotation axis is formed between the first support portion and the second support portion.

5. The apparatus of claim 3, wherein the guide unit includes a guide groove having a curvature corresponding to a rotation path of the guide unit.

6. The apparatus of claim 1, wherein the guide unit includes:
 a first cylinder configured to move the pressing unit in the third direction different from the second direction; and
 a second cylinder configured to move the second support portion in the second direction.

7. The apparatus of claim 1, wherein the pressing unit includes a pressing surface configured to press and bend the sealing part of the battery cell, and
 at least a portion of the pressing surface is a flat surface parallel to the second direction.

8. The apparatus of claim 7, wherein the pressing surface is configured to be in contact with the sealing part to heat the sealing part.

9. The apparatus of claim 1, wherein one surface of the sealing part is in contact with and pressed by the pressing unit, and
 the other surface of the sealing part opposite to the one surface of the sealing part is in contact with and supported by the second support portion.

10. The apparatus of claim 1, wherein the sealing part is configured to be folded toward the body part, and
 wherein the second support portion is configured to be inserted between the body part and the sealing part.

11. The apparatus of claim 1, wherein the pressing unit is configured to reciprocate in a third direction intersecting the second direction.

12. The apparatus of claim 1, wherein the second support portion is configured as a plate-shaped member having a surface parallel to the second direction.

13. An apparatus for manufacturing a battery cell including a body part in which an electrode assembly is accommodated and a folded sealing part formed on a side of the body part, the apparatus comprising:
 a guide unit;
 a pressing unit coupled to the guide unit; and
 a support unit including a first support portion and a second support portion,
 wherein the second support portion is coupled to the guide unit,
 wherein the guide unit is rotatable and the pressing unit and the second support portion are configured to rotate together with the guide unit,
 wherein the first and second support portions are configured to hold and support the battery cell with the second support portion positioned between the side of the battery cell and the folded sealing part,
 wherein the pressing unit is configured to press and heat the folded sealing part against the second support portion,
 wherein the pressing unit and the second support portion are connected to the guide unit,
 wherein the pressing unit is configured to press and fold the sealing part positioned between the first support portion and the second support portion in a third direction,
 wherein the third direction is configured to extend toward the body part, such that the pressing unit is configured to press the sealing part against the body part, and
 wherein the second direction and third direction are arranged perpendicularly.

* * * * *